H. H. MURRAY & W. D. LA RUE.
GEARING FOR TALKING MACHINES.
APPLICATION FILED MAY 10, 1912.
1,188,979.
Patented June 27, 1916.
2 SHEETS—SHEET 2.
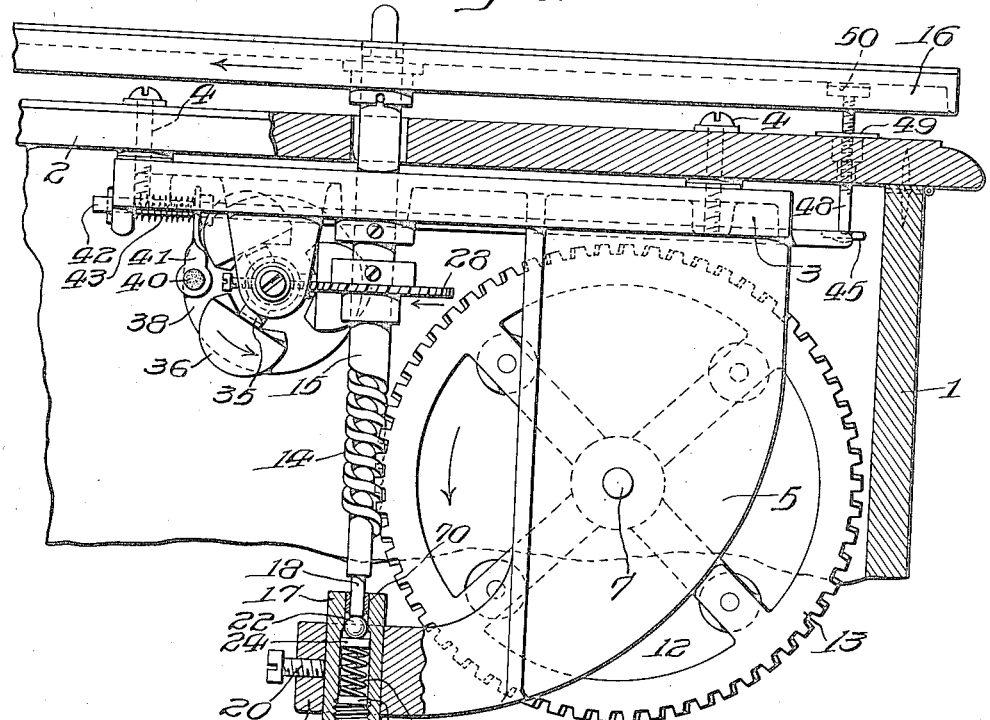
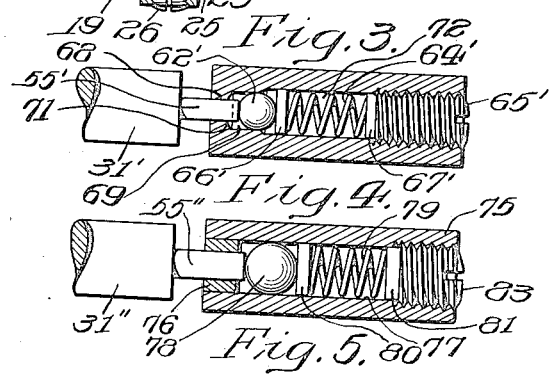
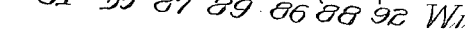
INVENTOR
Henry H. Murray.
William D. La Rue.
WITNESSES
BY
ATTORNEY

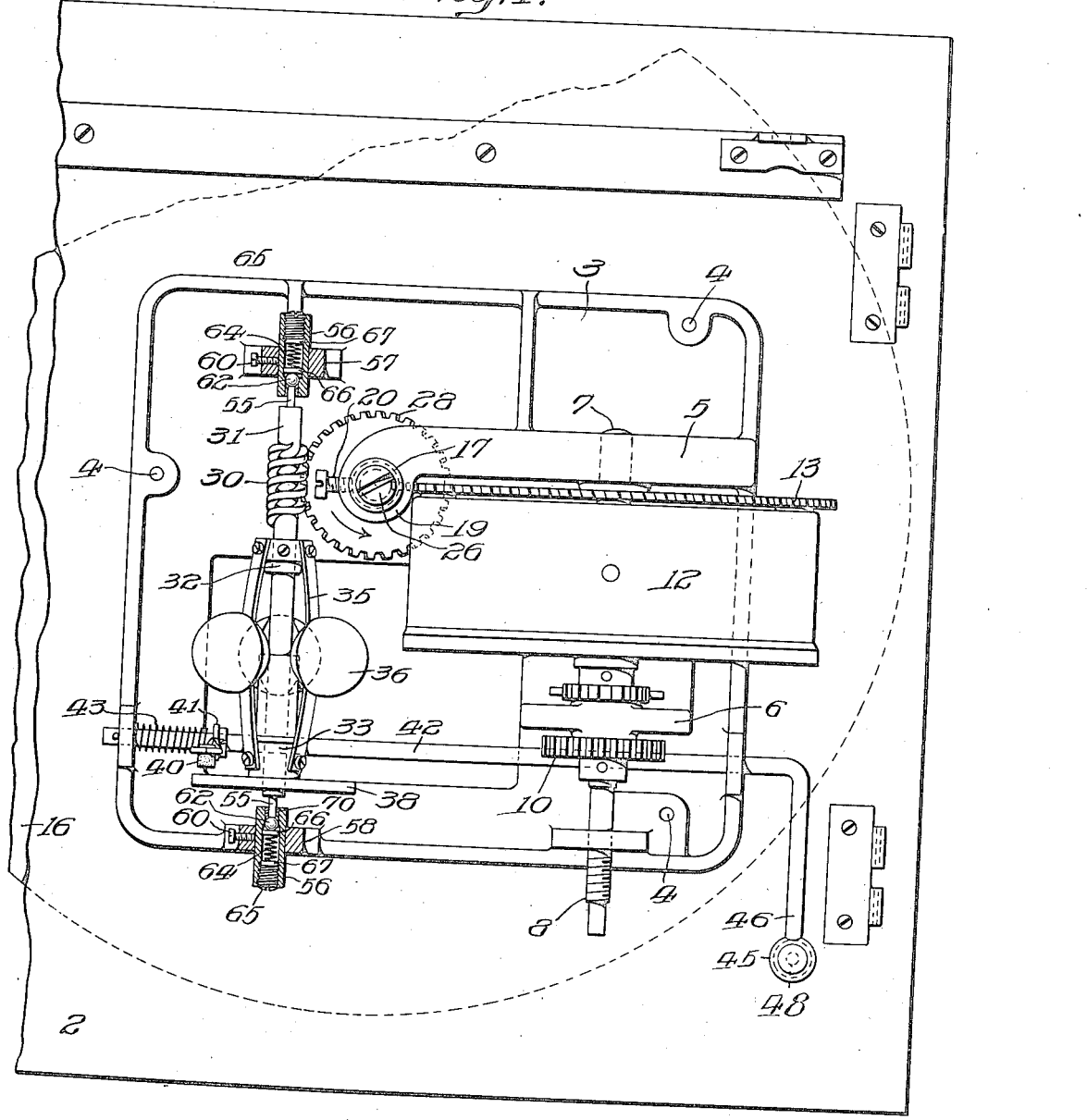

UNITED STATES PATENT OFFICE.

HENRY H. MURRAY, OF RIVERTON, AND WILLIAM D. LA RUE, OF CAMDEN, NEW JERSEY, ASSIGNORS TO VICTOR TALKING MACHINE COMPANY, A CORPORATION OF NEW JERSEY.

GEARING FOR TALKING-MACHINES.

1,188,979.

Specification of Letters Patent. Patented June 27, 1916.

Application filed May 10, 1912. Serial No. 696,328.

*To all whom it may concern:*

Be it known that we, HENRY H. MURRAY and WILLIAM D. LA RUE, both citizens of the United States, and residents of Riverton, county of Burlington, and State of New Jersey, and the city of Camden, county of Camden, and State of New Jersey, respectively, have invented certain new and useful Improvements in Gearing for Talking-Machines, of which the following is a specification, reference being had to the accompanying drawings.

This invention particularly relates to the motor of a talking machine, and is especially directed to the bearings for rotatably supporting the worm shafts or spindles.

It is highly essential in talking machines that the actuating mechanism shall be of such accuracy that the actuation of the relatively movable coöperative parts will not produce disagreeable and annoying sounds which are audible during the reproduction of a sound record. Such accuracy in construction materially increases the cost of manufacture, and even when worms and gears are cut with the greatest care, there may be certain unavoidable irregularities and inaccuracies therein which will tend to produce varying friction, and consequent noise due both to the friction and to backlash.

The principal objects of this invention are, to provide a talking machine motor which is absolutely noiseless, and to provide means to compensate for any irregularities in the gearing mechanism, and thereby effect a steady actuation of the coöperative gearing members.

Other objects of this invention, specifically stated, are, to provide a talking machine motor with worm gearing having floating shafts or spindles; and to provide bearings for said shafts or spindles having end thrust cushioning mechanism arranged to permit the free axial movement of said spindles in their bearings.

Briefly stated, the form of this invention hereinafter described provides a turn-table shaft or spindle journaled in a suitable bearing, having resilient means supporting said shaft or spindle and tending to thrust a movable bearing member against the end of the shaft; a driving worm-gear coöperative with a worm to rotate said shaft; a governor shaft or spindle, journaled at its opposite ends in bearings respectively having resilient means tending to thrust a bearing member against the opposite ends of the governor spindle and permitting a slight axial movement of said spindle in said bearing; and a worm-gear on the turn-table shaft in coöperative relation with the worm of said governor shaft to actuate the governor.

This invention further comprehends all of the various novel features of construction and arrangement hereinafter more definitely specified.

In the accompanying drawings, Figure 1 is an inverted plan view of the talking machine motor showing the cushion bearings of the governor spindle in section for convenience of illustration, and showing a fragment of the lid of the talking machine casing and turn-table; Fig. 2 is a side elevational view of the mechanism shown in Fig. 1 returned to its operative position, showing the cushion bearing for the turn-table shaft in section for convenience of illustration; Fig. 3 is an enlarged longitudinal sectional view of another construction of the cushion bearings; Fig. 4 is a longitudinal sectional view of another form of cushion bearing; and Fig. 5 is a longitudinal sectional view of still another modification of the cushion bearing.

In said figures, the motor is inclosed in the casing 1 and when in operative position is suspended from the underside of the cover 2, to which it is secured and comprises the frame 3, engaged with said cover by screws 4 and having the hangers 5 and 6 in which the main driving shaft 7 is journaled. Said driving shaft 7 is connected with the winding spindle 8 by the usual gearing 10, and is provided with the spring drum 12 inclosing the spring by which the motor is driven. The driving shaft 7 carries the worm-gear 13 coöperatively engaged with the worm 14 on the turn-table shaft 15, which extends upwardly through the lid or cover 2 of the casing 1 and rotatably supports the turn-table 16.

The turn-table shaft 15 is preferably provided with a reduced portion 18 forming a trunnion rotatably mounted in the bearing 17, which is adjustably engaged in the laterally curved depending extension 19 of the hanger 5, and which is secured therein by the set-screw 20. The bearing 17 comprises the bearing ball 22, upon which the end of the shaft 15 is supported, the spring 23 tending to press said bearing ball 22 into engagement with the end of said shaft, and the washers 24 and 25, of leather or other suitable material, respectively disposes between said ball 22 and spring 23, and between said spring 23 and the adjustable retaining plug 26.

It will be readily seen that the rotation of the worm-gear 13 in the direction of the arrow indicated thereon in Fig. 2 tends to thrust the turn-table shaft 15 axially in opposition to the spring 23, and that any inequalities or irregularities in the worm-gear 13 or worm 14 may be compensated for by a slight axial movement of said turn-table shaft 15, the spring 23 tending to at all times maintain the coöperative surfaces of the threads of the worm 14 and the teeth of the worm-gear 13 in contact, thereby preventing backlash.

The turn-table shaft 15 carries the worm-gear 28, which is in coöperative engagement with the worm 30 on the governor shaft or spindle 31, which carries the governor comprising the hub 32 fixed on said shaft and the sleeve 33 axially movable thereon, the spring strips 35 connecting said hub and sleeve, and carrying the governor balls 36, by the centrifugal expansion of which the sleeve 33 is shifted axially on the governor shaft 31, carrying the disk 38, into engagement with the speed regulating mechanism.

The speed regulating mechanism comprises the friction pad 40 carried by the lever 41 on the rock-shaft 42, having the spring 43 arranged to maintain the flattened end 45 of the laterally bent arm 46 of said rock-shaft 42 in engagement with the end of the regulating screw 48. Said regulating screw 48 is in threaded engagement with the bushing 49 in the lid or cover 2, and is provided with the knurled head 50 for its convenient axial adjustment to rock the shaft 42 and thereby predetermine the position of the friction pad 40 with respect to the governor disk 38, and consequently to regulate the speed of the motor.

The governor shaft 31 is preferably provided with reduced portions 55 at its opposite ends, forming trunnions rotatably engaged in the bearings 56, which are adjustably engaged in the bearing hangers 57 and 58 by the set-screws 60. The bearings 56 are arranged to permit the governor shaft 31 to float axially, and respectively comprise cushioning means having a bearing ball 62 thrust into engagement with the end of the governor spindle 31 by the spring 64, the tension of which may be adjusted by the adjustable screw plug 65 in threaded engagement with the walls of said bearing spring 64. The spring 64 is preferably separated from the bearing ball 62 and adjustable plug 65 by washers 66 and 67, preferably formed of non-resonant material, such as leather, wood, paper, respectively disposed between the bearing ball 62 and spring 64, and between said spring 64 and adjustable plug 65, to prevent the possibility of audible sounds being produced by contact of said spring with the bearing ball or adjusting plug.

It may be here noted that an initial adjustment of the tension of the bearing spring may be effected by shifting the bearings axially in their respective supporting hangers and securing them in such adjusted position by their respective set-screws, and that the further and more delicate adjustment of the tension of said springs may be effected by the rotation of the adjustable screw plugs, to effect their axial movement in or out with respect to the bearing, depending upon whether a greater or less tension of the bearing spring is desired.

As best shown in Fig. 3, it is preferable to provide the respective bearings with a bore having regions of relatively different diameters respectively providing a contracted aperture 68, in which the reduced trunnion portion 55' of the shaft 31' is rotatably fitted; a restricted chamber 69 of relatively greater diameter and embracing the bearing ball 62', which snugly fits said chamber and which is prevented from accidental displacement by the shoulder 71, formed by the difference in diameter between the trunnion aperture 68 and the ball chamber 69; and the relatively larger spring chamber 72, within which is disposed the spring 64', which may be of such dimension and strength as to be adequate to sustain the thrust of the shaft 31' incident to the coöperation of the worm 30 and worm-gear 28, when the latter is rotated by the driving mechanism.

It will be obvious that a bearing constructed in accordance with this invention is self-contained; that is to say, that the movable parts therein are retained by the shoulders formed between the regions of relatively different diameters of the bore, and by such construction said bearing provides the thickest walls at the regions embracing the rotary members comprising the shaft and bearing ball, and consequently prevents any distortion that would be liable to interfere with the free rotation of said rotary members; the cost of production of said bearing is materially reduced by contracting the bore and employing a relatively small bearing ball; and the frictional contact between the reduced trunnion portion 55 of the shaft 31 and the walls of the contracted bearing aperture 68 is rendered substantially negligible. Although it is preferable to form the bearing in one piece, it may, if desired, be provided, as shown in Fig. 1, with a bearing bushing 70 of suitable bearing material that may be readily replaced when worn.

By reason of the fact that the bearing above described comprises a bore having regions of relatively different diametrical extent, whereby shoulders are provided, the relatively movable members may be easily assembled. Furthermore, said bearing may be applied to talking machines now on the market without modifying their construction.

The bearing 75, shown in Fig. 4, comprises a separate bearing bushing 76, preferably formed of hard wood or other suitable material, for supporting the reduced portion 55″ of the spindle 31″, and said bearing is provided with a bore 77 which is substantially uniform throughout its extent, and within which is disposed the bearing ball 78, spring 79 and the interposed washers 80 and 81, all maintained in adjusted position and under a predetermined tension, to thrust the bearing ball 78 into contact with the end of the shaft 31″, by the adjustable screw plug 83.

In the form of this invention shown in Fig. 5, the bearing 85 has a bore 86 which extends inwardly from its inner end and embraces the bearing ball 87, spring 88 and non-resonant washers 89 and 90 respectively disposed between the bearing ball 87 and spring 88, and the spring 88 and the solid outer end portion 92 of said bearing 85.

By thus floatingly supporting the worm shafts or spindles of a talking machine motor, it will be obvious that any irregularities or inaccuracies in either the worm or its coöperative gear will be compensated for by the slight movement of the spindle in its bearings, and that such movement will be against the cushioning mechanism which tends to resiliently oppose the thrust of the spindle, and maintains the adjacent coöperative inclined surfaces of the worm and worm-gear in contact, and thereby prevents any tendency of the worm and gear to backlash.

It is not desired to limit this invention to the precise details of construction and arrangement herein set forth, as various modifications may be made therein without departing from the essential features of the invention as defined in the appended claims.

Having thus described our invention, we claim:

1. In a spring motor for talking machines, the combination with a driving spring, of a worm gear actuated by said driving spring, a rotatable spindle, a worm rigid with said spindle and engaging and driven by said worm gear, said spindle having a limited longitudinal movement, and a compensating spring having a free end acting upon said spindle and tending to move said spindle longitudinally in the direction to oppose the thrust of said worm gear on said worm, and said compensating spring acting to control the said longitudinal movement of said spindle to maintain the surfaces of said worm and said worm gear in even and continuous engagement and to absorb vibrations between said parts, and to compensate for irregularities in the unwinding of said driving spring.

2. In a spring motor for talking machines, the combination with a driving spring, of a worm gear rotated by said spring, a floating spindle having limited play in both directions longitudinally, a worm rigid with said spindle and engaging and driven by said worm gear, and opposed compensating springs having free ends acting on said spindle to oppose the longitudinal play of said spindle in opposite directions respectively, to absorb vibrations between said worm gear and said worm, and to maintain the surfaces of said worm gear and said worm in even and continuous engagement, and to compensate for irregularities in the unwinding of said driving spring.

3. In a spring motor for talking machines, the combination with a driving spring, of a worm gear actuated by said driving spring, a rotatable spindle, a worm rigid with said spindle and engaging and driven by said worm gear, said spindle having a limited longitudinal movement, a floating governor spindle having limited play longitudinally in both directions, a worm rigid with said governor spindle, a worm gear rigid with said first mentioned spindle and engaging said last mentioned worm, a compensating spring having a free end acting upon said spindle and tending to move the same longitudinally in a direction to oppose the thrust of said first mentioned worm gear upon said first mentioned worm, and opposed compensating springs having free ends acting upon said governor spindle and opposing its movement longitudinally in opposite directions respectively and arranged to oppose the thrust of said second mentioned worm gear upon said second mentioned worm, said compensating springs acting to maintain the respective surfaces of said worms and said worm gears in even and continuous engagement and to absorb vibrations between said worm gears and said worms respectively and coöperating to compensate for irregularities in the unwinding of said driving spring.

In witness whereof we have hereunto set our hands this 3rd day of May, A. D., 1912.

HENRY H. MURRAY.
WILLIAM D. LA RUE.

Witnesses:
 FRANK B. MIDDLETON, Jr.,
 JOHN D. MYERS.